UNITED STATES PATENT OFFICE.

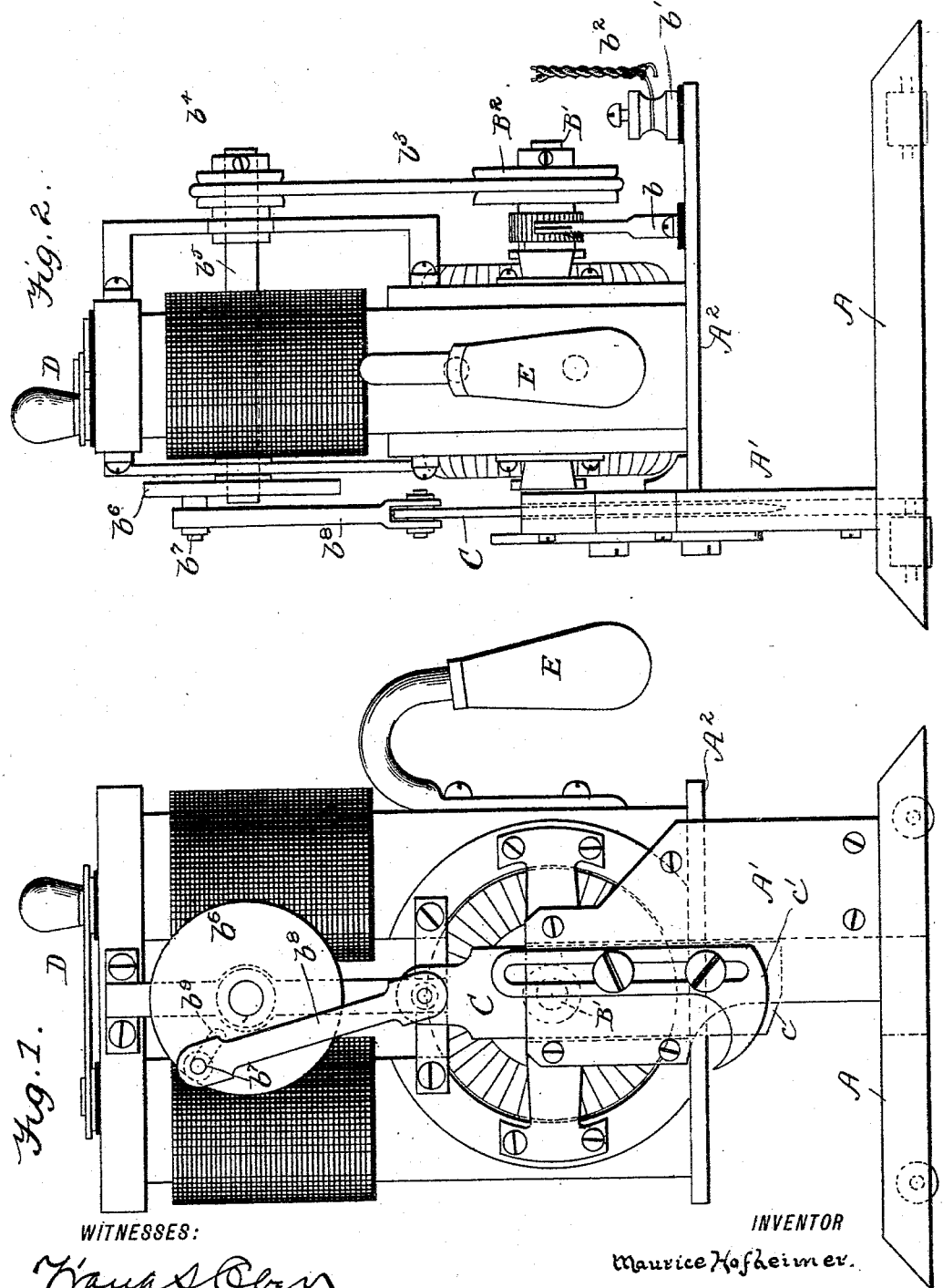

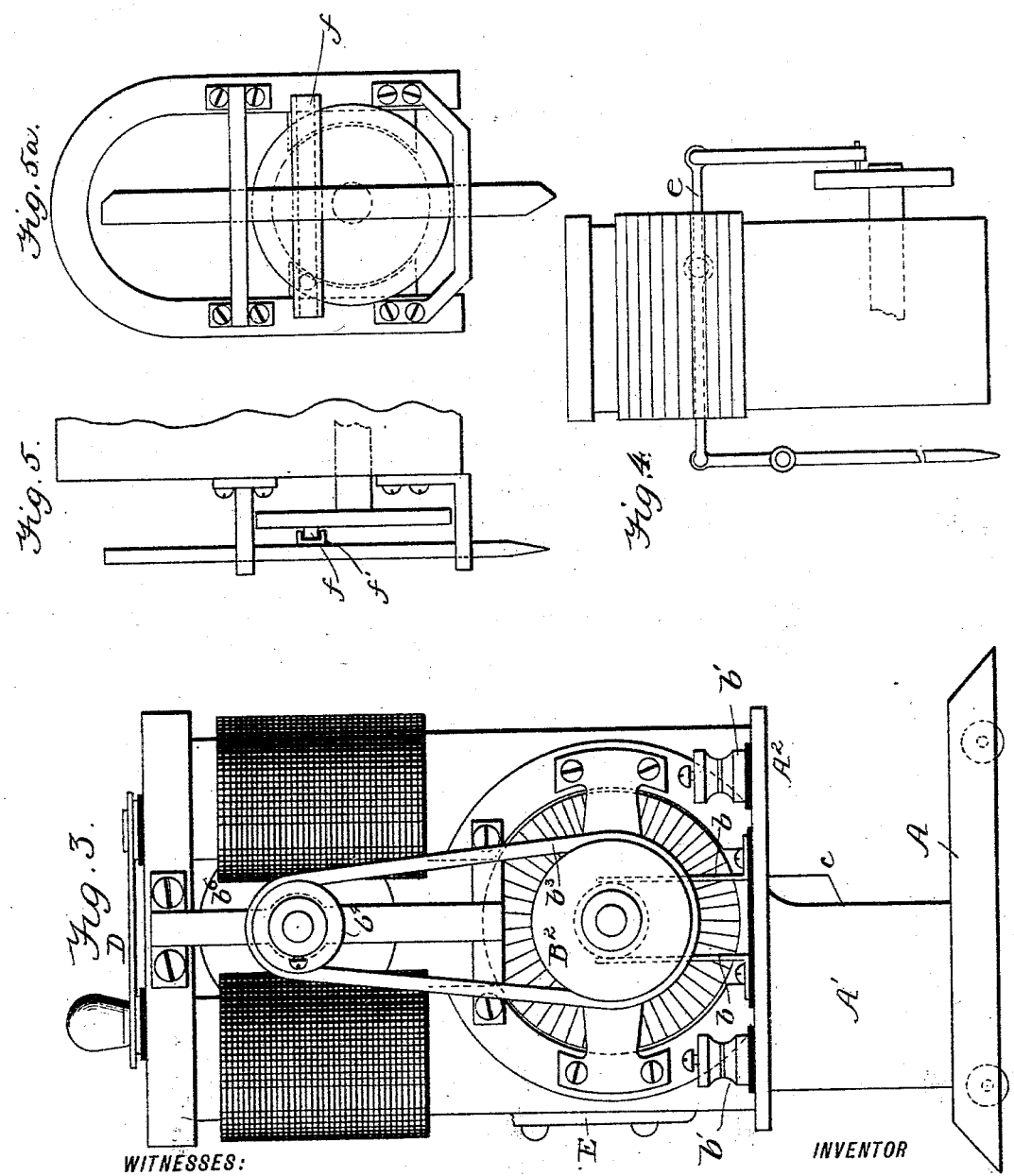

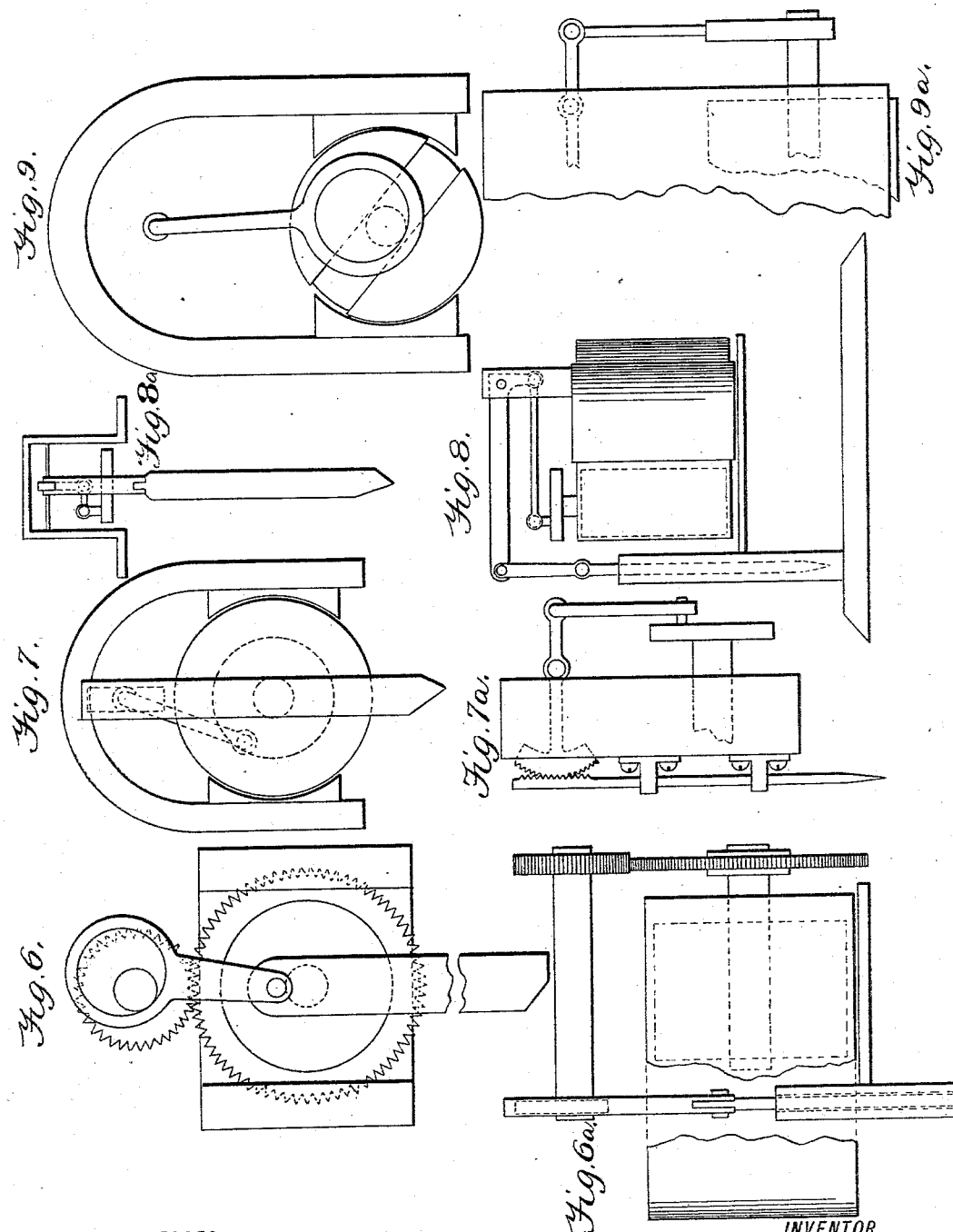

MAURICE HOFHEIMER, OF NEW YORK, N. Y.

CLOTH-CUTTING MACHINE.

SPECIFICATION forming part of Letters Patent No. 425,572, dated April 15, 1890.

Application filed December 18, 1889. Serial No. 334,183. (No model.)

*To all whom it may concern:*

Be it known that I, MAURICE HOFHEIMER, a citizen of the United States, residing in New York city, in the county of New York and State of New York, have invented certain new and useful Improvements in Cloth-Cutting Machines, of which the following is a specification.

The invention relates to certain improvements in machines for cutting textile fabrics, leather, paper, and other materials.

The objects of the invention are to provide a machine which shall cut the fabrics into the shapes and parts required for garments, &c., in greater thicknesses than is possible with a pair of shears operated by the hand, a machine which shall perform this service in an efficient manner, and a machine whose advantage over other machines now known shall be the direct combination of the motive power with the mechanism it is to operate, and the consequent dispensing with all intermediate gears and mechanisms which are necessary for the transmission of power when the source of power is distant from the operating portion of the machine. The underlying principle of my invention, therefore, will be the direct combination of a motive machine with a cutting-knife and operating mechanism, substantially as hereinafter described. As a result of this combination the energy which is required to run any intermediate gearing with the aggregation of its lost motion will be saved. In this saving of energy will consist the first advantage of my invention. The energy required to perform a given amount of work being less, the power-machine will be proportionately smaller. Thirdly, my machine will be more convenient and cleanly than those now in use, and will be easier to manipulate, as it will be free from all the hinderances to operating with which the transmission of power is identified. It will have no connection with the table and will be readily movable over its entire extent.

In order to make the above objects and advantages understood, I will describe briefly the most common form of machines now in use. It consists of a reciprocating knife running in guides fixed to a base. The base is on rollers and may be moved about in any direction over a table upon which the fabric rests while being cut. Motion is imparted to the knife through a system of leverage and joints from a driven shaft or pulley located at or near one side of the table.

Referring to the accompanying drawings, Figures 1 and 3 represent side elevations of my improved machine; Fig. 2, an end elevation, and Figs. 4 to 9ª, inclusive, represent modified or alternative arrangement of the mechanism for converting the rotary motion of a motor into a reciprocating motion for operating the knife.

The power which I utilize for driving the knife is electricity, as this is the most easily controlled. I however do not limit myself to an electric motor, because I believe that I am the first to conceive the idea of mounting a motor of any kind directly upon the same support which carries the knife.

A represents a base-plate provided with rollers, which facilitate its movement in any direction over the surface of the cutting-table. This plate usually slides upon the table beneath the pile of fabric which the machine cuts. At one side of this plate I fix vertically a standard A'. The standard and plate are of metal and preferably formed integral. To one side of the standard is secured in any suitable manner a second metallic plate $A^2$, which is parallel to the base-plate. This plate supports an electric motor whose armature-shaft B' is parallel to the plate $A^2$ and at right angles to the support A'. The pole-pieces of the motor are secured in any manner to the plate $A^2$ and the bearings of the armature-shaft are secured to the pole-pieces by brackets, as shown. The motor-brushes $b$ are mounted upon the plate $A^2$ in this instance, and current is conveyed to them from the main binding-post $b'$ which is connected with any source of electricity by flexible conductors $b^2$.

The support A' has formed upon or within it vertical guides for a reciprocating knife C, whose cutting-edge is at $c$. A slot is made in the base-plate A, which forms a continuation to the guideways in the support, so that the knife may pass partly through the plate in making its reciprocations and be entirely removed from the machine when it becomes necessary for sharpening or other purposes. On the outside of the support A' is adjustably secured a presser-foot $c'$, which may be adjusted at any height in accordance with the thickness of the goods to be cut. This foot presses upon the top of the goods and slightly compresses it at the point where the knife is at work.

In Figs. 1 to 3 reciprocating motion is imparted to the knife by means of the pulley $B^2$ on the armature-shaft, which communicates motion through a belt $b^3$ to a pulley $b^4$ on counter-shaft $b^5$. This counter-shaft passes between the two magnet-spools of the motor, and upon its opposite end carries a disk $b^6$, having a crank-pin $b^7$, which engages with pitman $b^8$, and the last is pivoted to the head of the knife, as shown. The rotation of the armature-shaft causes a rapid reciprocation of the knife. The location of a counter-shaft above the armature-shaft enables me to have the motor as low as possible with a given length of stroke, and thereby renders the machine easier of manipulation by the operator. The length of the movement which is imparted to the knife may be regulated by means of the slot $b^9$, (shown in the disk $b^6$.) By loosening the crank-pin and setting it nearer the center of the disk the throw of the knife will be shortened. It is obvious that a simple crank may be substituted for the disk $b^6$; but I prefer to use the disk, inasmuch as it acts in the nature of a fly-wheel. The guideway for the knife and the shape of the support $A'$ are such that the forward edge of the knife will be uncovered while passing through the cloth, and the support $A'$ is further formed as thin as possible without sacrificing strength, so that it may follow nicely in the kerf cut by the knife.

I have shown on the top of the motor a switch D, which may be used to stop and start the motor. I have also shown a handle E, fixed to one of the pole-pieces, by means of which the whole machine may be guided through the cloth in following the pattern.

It is to be understood that the location and arrangement of the handle, the switch, the commutator-brushes, and, in fact, all the details of construction may be altered without affecting the spirit of my invention, the broad idea of which is the mounting of the motor with its necessary attachment in direct connection with the knife.

In Figs. 4 to $9^a$ I have shown a number of different methods of connecting the armature-shaft of the motor with the knife. In Fig. 4 the crank is placed on the armature-shaft and is connected to operate a rocking lever $e$, which communicates its movement directly to the knife. Figs. 5 and $5^a$ show a crank or disk on the end of the armature-shaft adjacent to the knife. The crank carries a pin $f$, which projects into a slot in a horizontal bar $f'$, connected to the knife. This mechanism imparts a reciprocating movement to the knife. In Figs. 6 and $6^a$ the motor is shown with a permanent magnet, which, however, may be substituted by an electro-magnet, and is placed on its side. The eccentric-shaft is driven direct by gearing from the armature-shaft and its motion is imparted to the knife through an eccentric. In Figs. 7 and $7^a$ the rocking bar shown in Fig. 4 carries a gear-segment, which meshes into a rack upon the knife, thus doing away with joints and links. In Figs. 8 and $8^a$ the motor is turned on its side and the armature-shaft is vertical. Its rotary movement vibrates a bell-crank lever, which in turn reciprocates the knife; and Figs. 9 and $9^a$ show an eccentric upon the armature-shaft, which may drive through a system of levers the knife. I have simply shown these numerous modifications of reciprocating knife to prevent others securing claims upon them.

Having thus described my invention, I claim—

1. In a cloth-cutting machine, the combination, with an electric motor and its armature-shaft supported upon a movable frame, of a reciprocating knife, also supported by said frame, a counter-shaft arranged above the armature-shaft, and connections whereby motion is transmitted from the armature-shaft to the knife through the counter-shaft, whereby the machine is rendered more compact and the center of gravity brought low, thereby facilitating the manipulation of the machine.

2. In a cloth-cutting machine, the combination, with an electric motor, its armature-shaft, and a reciprocating knife, of means connecting the motor with the knife, consisting of a counter-shaft driven from the motor-shaft and arranged above said motor-shaft, a crank or equivalent on the counter-shaft, and a pitman connecting the crank with the knife, whereby the machine is rendered more compact and the center of gravity brought low, thereby facilitating the manipulation of the machine.

In witness whereof, I have hereunto signed my name in the presence of two subscribing witnesses.

MAURICE HOFHEIMER.

Witnesses:
WM. A. ROSENBAUM,
THOMAS K. TRENCHARD.